United States Patent [19]
Newburg

[11] 3,791,736
[45] Feb. 12, 1974

[54] METHOD AND APPARATUS UTILIZING THE PHASE VELOCITY DIFFERENCE OF LIGHT RAYS FOR MEASURING THE VELOCITY OF A MOVING OBJECT

[75] Inventor: Ronald G. Newburg, Belmont, Mass.

[73] Assignee: The United States of America as represented by the Secretary of the Air Force, Washington, D.C.

[22] Filed: Apr. 28, 1972

[21] Appl. No.: 248,585

[52] U.S. Cl............... 356/27, 250/225, 350/147, 356/28, 356/116
[51] Int. Cl. ..................... G01p 3/36, G01n 21/40
[58] Field of Search ........ 356/27, 28, 116; 350/147; 250/225

[56] References Cited
UNITED STATES PATENTS
3,692,385  9/1972  Gievers........................... 350/147
3,506,362  4/1970  Doyle et al. .................. 356/106 LR Primary Examiner—Ronald L. Wibert
Assistant Examiner—V. P. McGraw

[57] ABSTRACT

Light transmitted through an optical birefringent retardation plate emerges as ordinary (O) and extraordinary (E) rays having a phase velocity difference characteristic of the plate material and thickness. Retardation plate motion introduces an additional phase velocity difference between the E- and O-rays that is a measure of the velocity of such motion. Velocity of a moving object is measured by affixing an optical retardation plate to the moving object, detecting the E- and O-ray phase velocity difference of coherent light transmitted through the moving plate, and converting the phase velocity difference values so obtained to linear and angular velocity values.

4 Claims, 2 Drawing Figures

METHOD AND APPARATUS UTILIZING THE PHASE VELOCITY DIFFERENCE OF LIGHT RAYS FOR MEASURING THE VELOCITY OF A MOVING OBJECT

BACKGROUND OF THE INVENTION

This invention relates to velocity measurement methods and devices, and in particular to means for remotely measuring and monitoring the linear and angular velocities of moving objects. It also finds utility as a laboratory device for testing the laws of composition of phase velocities.

There are many applications in which the velocity of a moving object must be measured accurately. Often the requirement is to measure and monitor the velocity of an object moving in a hazardous environment. Such applications generally require both extremely accurate measurements and the capability of taking such measurements from a remote location. Currently available velocity measuring devices such as speedometers, tachometers, stroboscopes, electronic devices, and radar systems are generally not as accurate as required and in many instances must be incorporated into the moving objects. Furthermore, adverse environmental conditions usually have deleterious effects on their performance. Accordingly, there currently exists the need for improved velocity measuring means capable of accurately detecting the velocities of moving objects from remote locations. The present invention is directed toward accomplishing this end.

SUMMARY OF THE INVENTION

In accordance with the principles of the invention, the velocity of a moving object is measured by affixing an optical birefringent retardation plate to the object; determining the phase velocity differences between E- and O-rays transmitted through the retardation plate at rest and in motion; and converting the phase information so obtained into linear and angular velocity measures. The apparatus comprehended by the invention comprises an optical birefringent retardation plate mounted on the moving object, a coherent light source positioned to transmit light through the retardation plate, a polarimeter positioned to receive the light thus transmitted, and a logic circuit adapted to operate on the output of the polarimeter. E- and O-ray phase velocity retardation values for the retardation plate at rest and appropriate phase velocity to linear and angular velocity conversion values are written into the logic circuit. The output of the polarimeter represents the phase velocity difference between the E- and O-rays transmitted through the moving retardation plate. The logic circuit subtracts the E- and O-ray phase velocity difference for the retardation plate at rest from this value and converts the difference into linear and angular velocity measures.

It is a principal object for the invention to provide a new and improved method for measuring the velocity of a moving object.

It is another principal object of the invention to provide new and improved apparatus for measuring the velocity of a moving object.

It is another object of the invention to provide highly accurate means for remotely measuring and monitoring the velocity of a moving object.

It is another object of the invention to provide means for testing the laws of composition of phase velocities.

These, together with other objects, advantages and features of the invention will become more apparent from the following detailed description when taken in conjunction with the illustrative embodiments in the accompanying drawings.

DETAILED DESCRIPTION OF THE PREFERRED EMBODIMENTS

The present invention is based on certain phenomena relating to the passage of light through an optical retardation plate. Optical retardation plates exhibit double refraction characteristics that cause light to be propagated in the plate material in two orthogonal directions for the electric vector. The two directions are designated as that of the E-ray (extraordinary ray) and that of the O-ray (ordinary ray). These rays travel through the material at different phase velocities, that is, the surfaces of constant phase for the E-ray travels in the material at a speed different from that for the O-ray surfaces. If light is incident on a doubly refracting material perpendicular to the optic axis, the E- and O-rays which are formed in the crystal are not spatially separated as they propagate but do emerge from the crystal with a phase difference, $\Delta\phi$.

It has been discovered that an additional phase difference, $\alpha\phi$, is introduced if the retardation plate is in motion relative to the light source, and further that the additional phase differences thus introduced is proportional to the velocity of the moving plate. This newly discovered phenomenon is utilized to effect the velocity measuring method and apparatus of the invention as hereinafter described.

Figure 1:
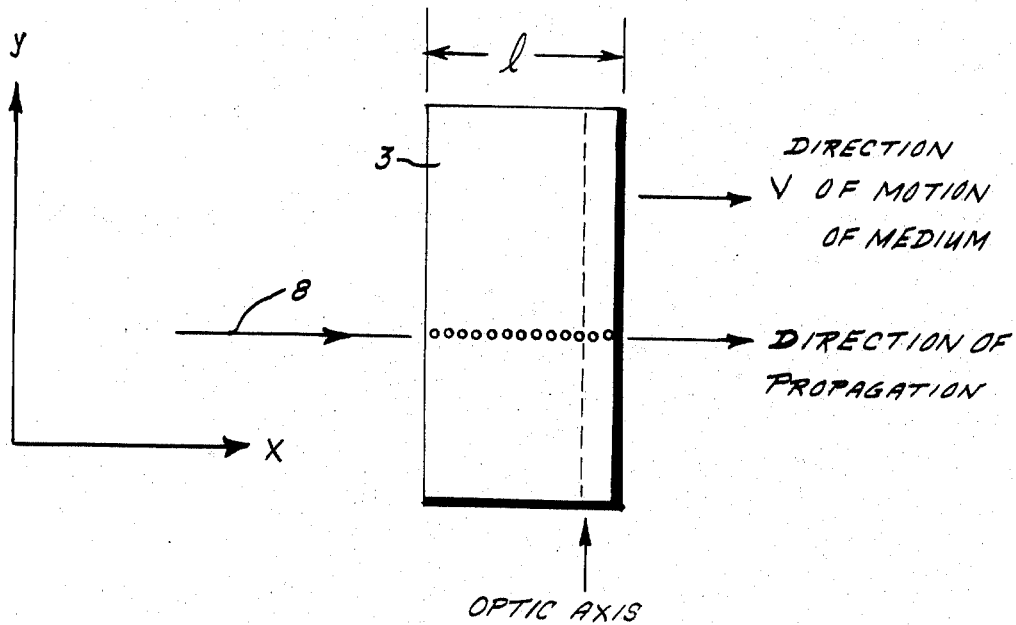
FIG. 1 illustrates an optical retardation plate of the type used in the invention.

FIG. 1 illustrates an optical retardation plate 3 of the type comprehended by the invention. Retardation plate 3 can be fabricated of calcite or any appropriate birefringent material.

The additional phase velocity difference introduced by the motion of the retardation plate and the relationship between this phase velocity difference and the velocity of the moving plate can be analytically demonstrated using Lorentz transformations for phase velocity.

The situation to be analyzed consists essentially of letting linearly polarized light fall on a moving retardation plate. In this arrangement the light source, detector and analyzing apparatus are all stationary in the laboratory frame of reference. The only motion is that of the retardation plate.

As indicated above, the effect of the retardation plate is to divide the incident ray into an ordinary ray (O-ray) and an extraordinary ray (E-ray), each ray traveling through the plate with a characteristic phase velocity. Since these two velocities are unequal, the rays recombine on emergence from the plate with a phase difference.

Letting $w$ and $v$ represent the phase velocity and frequency in a stationary medium and $w'$ and $v'$ represent the transformed quantities in the medium moving with velocity $v$, the general transformations are $$w' = (w+v \cos \alpha)/[1+2vw \cos \alpha/c^2+v^2w^2/c^4-v^2 \sin^2 \alpha/c^2\ ^{1/2}]$$
$$v' \sin \alpha'/w' = v \sin \alpha/w \quad (1)$$

$$v' \cos \alpha' w' = v(\cos \alpha + vw/c^2)/w(1 - v^2/c^2)^{1/2}$$

if the direction of propagation is in the $xy$ plane. The angle $\alpha$ is the angle between the direction of propagation and the direction of velocity $v$ as shown in FIG. 1.

If $\alpha$ is zero, Equations (1) reduce to
$$w' = (w + v)/(1 + vw/c^2)$$
$$v'/w' = v(1 + vw/c^2)/w(1 - v^2/c^2)^{1/2} \quad (2)$$

In any refractive medium the phase and ray velocities are in general different. Only if the direction of propagation is parallel to the direction of motion of the medium are the two velocities identical.

For the stationary case the difference in phase $\Delta\phi$ between the E-ray and O-ray on emergence from the plate is
$$\Delta\phi = \phi_e - \phi_o$$
$$= 2\pi (t_e - t_o)/T \quad (3)$$
$$= 2\pi lv(1/w_e - 1/w_o)$$

In Equation (3) $T$ is the period, $t_e$ and $t_o$ are the times required to traverse the plate for the E-ray and O-ray respectively, $l$ is the plate thickness, and $w_e$ and $w_o$ are the respective phase velocities.

To calculate the corresponding quantity $\Delta\phi'$ for the moving plate is slightly more complicated. In the time $t'$ in which a ray travels through the plate, the plate itself moves a distance $vt'$. Moreover owing to the Lorentz contraction the plate thickness becomes $l(1 - v^2/c^2)^{1/2}$. Therefore:
$$l(1 - v^2/c^2)^{1/2} + vt' = w't' \quad (4)$$

which, when solved for $t'$, gives
$$t_e' = l(1 - v^2/c^2)^{1/2}/w_e'(1 - v/w_e')$$
$$t_o' = l(1 - v^2c^2)^{1/2} + w_o'(1 - v/w_o') . \quad (5)$$

The phase difference $\Delta\phi$ may be written as
$$\Delta\phi' = 2\pi(t_e'/T_e' - t_o'/T_o') \quad (6)$$

The simplest case in which $\alpha$ equals zero can now be considered. By using Equations (2) the exact equation
$$\Delta\phi' = 2\pi v(1 - v^2/c^2)^{-1/2} \{(1 + v/w_e)(1 + vw_e/c^2)w_e - 1 + v/w_o)(1 + w_o/c^2)/w_o\} \quad (7)$$

is obtained.

Neglecting second or higher order terms in $v/c$, the following relationship is derived:
$$\Delta\phi' = 2\pi lv [(1/w_e - 1/w_o) + v(1/w_e^2 - 1/w_o^2) + \ldots ] \quad (8)$$
$$= +\phi + \delta\phi$$

where $\Delta\phi$ is the stationary phase difference given by Equation (3). The additional quantity $\delta\phi$ arises from the motion of the plate. It can be rewritten as
$$\left. \begin{array}{l} \delta\phi = 2\pi lv(1/w_e - 1/w_o) v(1/w_e + 1/w_o) \\ \text{or} \\ \delta\phi = \Delta\phi(n_e + n_o) v/c \end{array} \right\} \quad (9)$$

where $n_e$ and $n_o$ are the indices of refraction for the E-ray and O-ray respectively. The foregoing analysis therefore predicts an additional phase difference, first order in $v/c$ and proportional to the original stationary phase difference and to the sum of the two indices.

The measurement of a phase retardation requires a polarimeter. Today it is possible to make polarimeter measurements to an accuracy of 0.01°. Retardation plates themselves represent phase differences which are actually many multiples of $2\pi$. For example, a nominal quarter wave plate has a thickness such that the retardation is $2\pi N + \pi/2$, where $N$ is a large number. A slab of calcite 3 cm thick corresponds to a retardation $\Delta\phi$ of approximately $2\pi \times 10^4$ radians for 5,890A light. Hence a $\delta\phi$ equal to 0.1°, which is 10 times greater than the limit of accuracy, would correspond to a velocity of 150 m/sec according to Equation (9). This is within experimental capabilities. Most predicted relativistic effects depend on very high velocities. The effect predicted by Equation (9) can be obtained at velocities not normally considered to be relativistic by compensating with an increased retardation $\Delta\phi$.

In the foregoing evaluation, the retardation plate is set into motion with respect to the source and observer, the significant velocity being the phase velocity. The analytical method used, therefore, tests the laws of composition of phase velocities. By changing the direction of motion of the plate with respect to the direction of the propagation vector the laws for all angles $\alpha$ can be examined.

Figure 2:
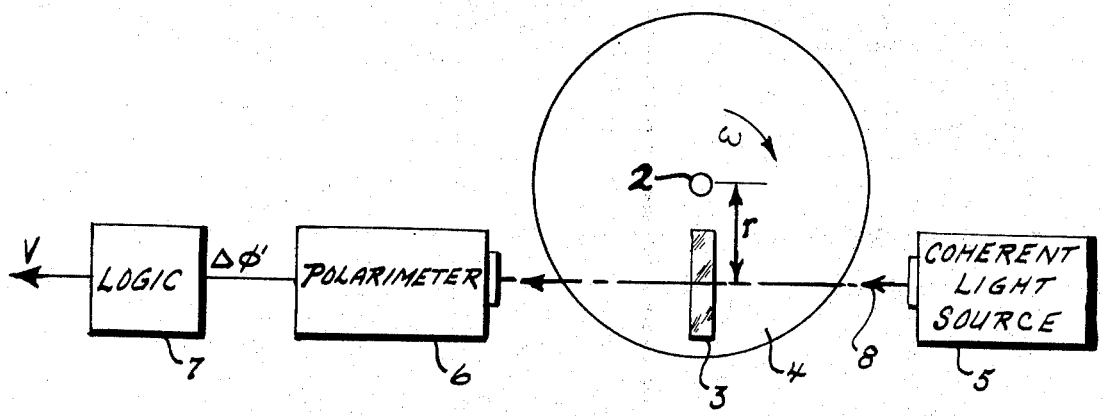
FIG. 2 illustrates one presently preferred embodiment of the invention.

Referring now to FIG. 2, there is illustrated thereby velocity measuring apparatus that utilizes the principles of the invention. The velocity (angular) of rotating shaft 2 is measured by mounting optical retardation plate 3 on support disc 4. Disc 4 is affixed to shaft 2. Coherent light source 5 projects light through retardation plate 3. Polarimeter 6 is positioned to receive the light so transmitted. The output of polarimeter 6 is fed to logic circuit 7. Logic circuit 7 contains the appropriate information (phase velocity to linear and angular velocity conversion factor, retardation plate and light source characteristics, etc.) required to convert the polarimeter output signal into linear and angular velocity values. Although not illustrated, arrangements for affixing the retardation plate to linearly moving objects are also within the scope of the invention.

While the invention has been described in its preferred embodiment, it is understood that the words which have been used are words of description rather than words of limitation and that changes within the purview of the appealed claims may be made without departing from the scope and spirit of the invention in its borader aspects.

I claim:

1. The method of measuring the velocity of a moving object comprising the steps of
    obtaining the phase velocity difference between the E- and O-rays of light transmitted through a given stationary optical birefringent retardation plate by a given stationary coherent light source,
    affixing said retardation plate to said moving object,
    projecting light through the moving retardation plate with said stationary coherent light source,
    obtaining the phase velocity difference between the E- and O-rays of the light transmitted through the moving retardation plate,
    subtracting the E- and O-ray phase velocity difference obtained from the starionary retardation plate from the E and O-ray phase velocity difference obtained from the moving retardation plate, and
    converting the resultant value into velocity measure.

2. Apparatus for measuring the velocity of a moving object comprising
- an optical birefringent retardation plate affixed to the moving object,
- a stationary remotely located coherent light source positioned to transmit light through said retardation plate,
- means for detecting the phase velocity difference values between the E- and O-rays of the light transmitted through the moving retardation plate, and
- a logic circuit connected to receive the output of said means for detecting phase velocity difference values, said logic circuit having the phase velocity difference value between the E- and O-rays of coherent light transmitted through said retardation plate in a stationary condition written into its memory circuits, said logic circuit being adapted to convert the phase velocity difference value stored in its memory circuits and the phase velocity difference values received from said means for detecting the phase velocity difference values into linear and angular velocity values.

3. Apparatus for measuring the velocity of a moving object as defined in claim 2 wherein said optical birefringent retardation plate comprises a calcite crystal plate.

4. Apparatus for measuring the velocity of a moving object as defined in claim 3 wherein said means for detecting phase velocity difference between E- and O-rays comprises a polarimeter.

* * * * *

UNITED STATES PATENT OFFICE
CERTIFICATE OF CORRECTION

Patent No. 3,791,736                  Dated February 12, 1974

Inventor(s) Ronald G. Newburgh

It is certified that error appears in the above-identified patent and that said Letters Patent are hereby corrected as shown below:

On front page, after Data Element Identifier /19/, change "Newburg" to -- Newburgh --.

On front page, after Data Element Identifier /75/, change "Ronald G. Newburg" to -- Ronald G. Newburgh --.

Signed and sealed this 5th day of November 1974.

(SEAL)
Attest:

McCOY M. GIBSON JR.                  C. MARSHALL DANN
Attesting Officer                    Commissioner of Patents